UNITED STATES PATENT OFFICE.

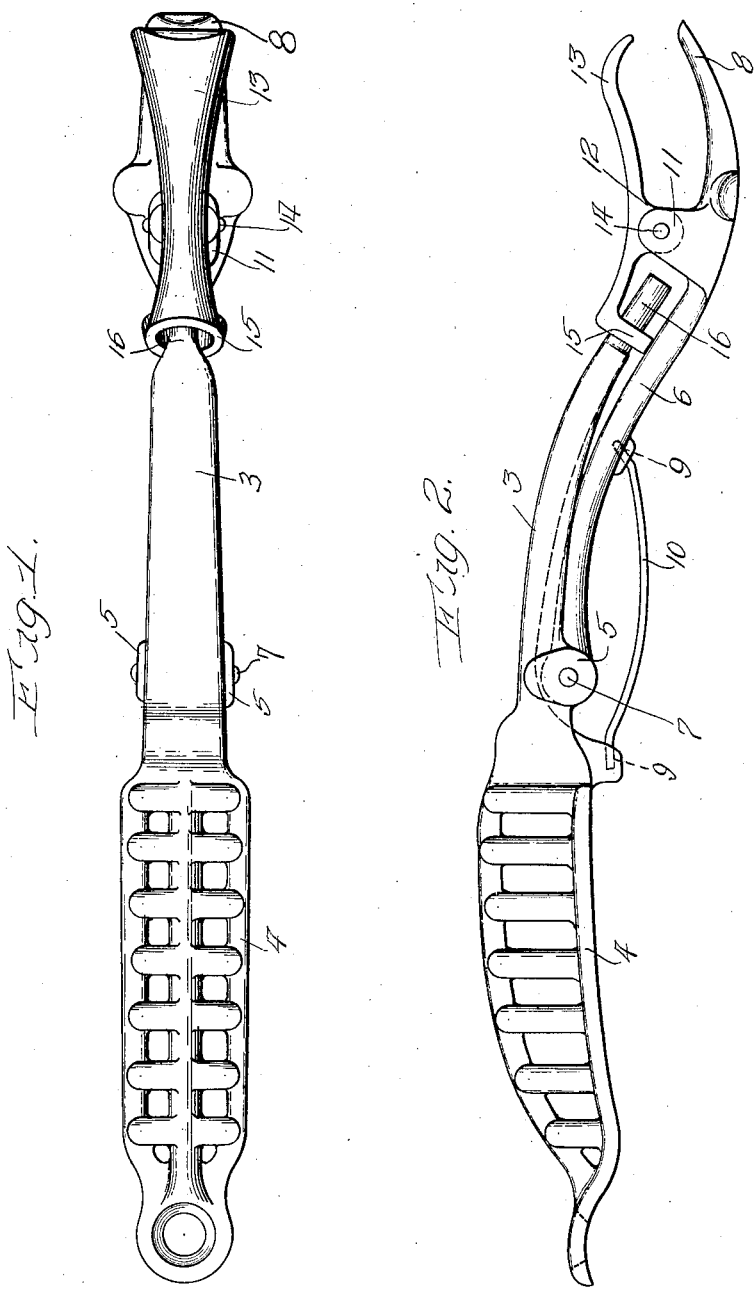

JOHN H. LAMBERT, OF BELVIDERE, ILLINOIS, ASSIGNOR OF ONE-HALF TO JOHN W. ELDREDGE, OF BELVIDERE, ILLINOIS.

STOVE-LID LIFTER.

1,349,211.　　　　　　Specification of Letters Patent.　　Patented Aug. 10, 1920.

Application filed May 31, 1919. Serial No. 300,860.

*To all whom it may concern:*

Be it known that I, JOHN H. LAMBERT, a citizen of the United States, residing at Belvidere, in the county of Boone and State of Illinois, have invented certain new and useful Improvements in Stove-Lid Lifters, of which the following is a specification.

My invention relates to stove lid lifters, and has for one of its objects the provision of simple and efficient means for securely holding and lifting stove lids, and the like.

A further object is the provision of a stove lid lifter which will automatically grip a stove lid when lifting the latter and automatically release the lid when released.

Other objects will appear hereinafter.

An embodiment of my invention is illustrated in the accompanying drawing, forming a part of this specification, and in which—

Figure 1 is a plan view of a stove lid lifter embodying my invention; and

Fig. 2 is a side view of the same.

In the drawing I have shown a handle lever 3 having a handle 4 at one end thereof. The handle 4 is preferably of open work so as to afford a considerable radiating surface to radiate heat from the device so that the handle will be cool when the lifter is in engagement with a hot stove lid, not shown.

At intermediate portions of the handle lever 3 are depending ears 5 between which one end of a jaw lever 6 is pivoted as at 7. The jaw lever 6 is provided with a jaw 8 adapted to engage and lift a stove lid. The handle lever 3 and jaw lever 6 are each provided with recesses in which the ends 9 of a spring 10 are disposed. The bar spring 10 may be any form of compression spring so that it tends to press the parts engaging the ends 9 away from each other.

On the jaw lever 6 are upstanding ears 11 between which ears 12 of a clamp lever 13 are pivoted as at 14. I have named the member 3 a handle lever, member 6 a jaw lever, and member 13 a clamp lever simply as a means of identifying these parts and it will be understood that these names have no further significance than an easy means of designating the parts mentioned.

At one end of the jaw lever 13 is a loop 15 which encircles a restricted portion 16 of the handle lever 3. The opening in loop 15 is sufficiently large to permit the part 16 to make necessary movements without undue play.

In operation an operator grasps the handle 4 and engages the jaw 8 in the eye of a stove lid, not shown. Then upon raising handle 4 the lever 6 will move downwardly on the pivotal point 7 against the spring 10. This downward movement of the lever 6 and upward movement of the end 16 of lever 3 tends to move the jaw of lever 13 down into clamping relation with the stove lid. This is so because the part 16 presses the loop away from the lever 6. The stove lid will then be clamped tightly between the jaws of clamp lever 13 and jaw lever 6. When it is desired to release the stove lid from the holder the stove lid is simply set down when the tension of spring 10 moves the parts automatically to their positions indicated in Fig. 2.

The end of lever 3, adjacent lever 6, is protected against direct heat from the stove lid by part 8. Furthermore, the space between the levers 3 and 6 and the position of the pivotal point 7 tend to keep the handle 4 from getting hot.

While I have illustrated and described the preferred form of my invention I do not desire to be limited to the precise details set forth, but desire to avail myself of such variations and changes as come within the scope of the appended claims.

I claim:—

1. A stove lid lifter comprising a handle lever having a recess therein; a jaw lever pivoted to the handle lever and having a recess therein; a clamp lever pivoted to the jaw lever and engaging the handle lever; and a spring having its ends disposed against the bottoms of said recesses, the sides of said recesses holding the spring against displacement.

2. A stove lid lifter comprising a handle lever having a recess therein; a jaw lever pivoted to the handle lever and having a recess therein; a clamp lever pivoted to the jaw lever; a loop at one end of the clamp lever encircling one end of the handle lever; and a bar spring having its ends disposed against the bottoms of said recesses and exerting force on the handle and jaw levers pressing portions of such handle and jaw levers toward each other and against a part of said loop and holding the clamping ends of the jaw and clamp levers apart.

3. A stove lid lifter comprising a handle lever having a recess therein; a jaw lever pivoted to the handle lever and having a recess therein; a clamp lever pivoted to the jaw lever and connected with the handle lever; and a compression spring having its ends disposed in said recesses and pressing against the bottoms of the latter, said spring pressing on said handle and jaw levers holding the connection therebetween tight and holding the jaw lever tightly against the clamp lever.

In testimony whereof I have signed my name to this specification on this 26th day of May, A. D. 1919.

JOHN H. LAMBERT.